Dec. 12, 1933.   L. W. HASSENDON   1,939,551
WATER COOLER
Filed Jan. 30, 1933    5 Sheets-Sheet 5
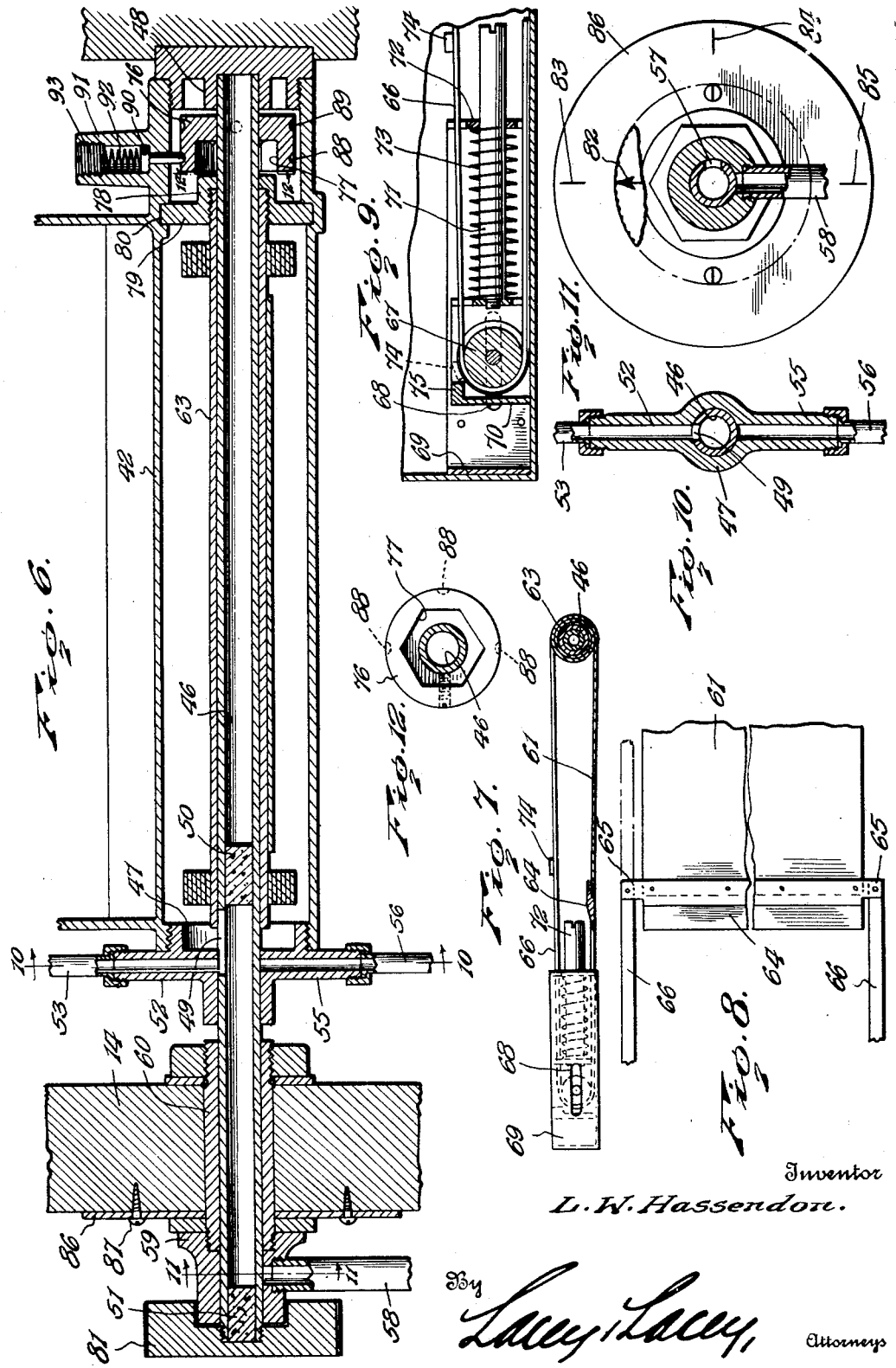
Inventor
L. W. Hassendon.
By Lacey & Lacey, Attorneys Patented Dec. 12, 1933

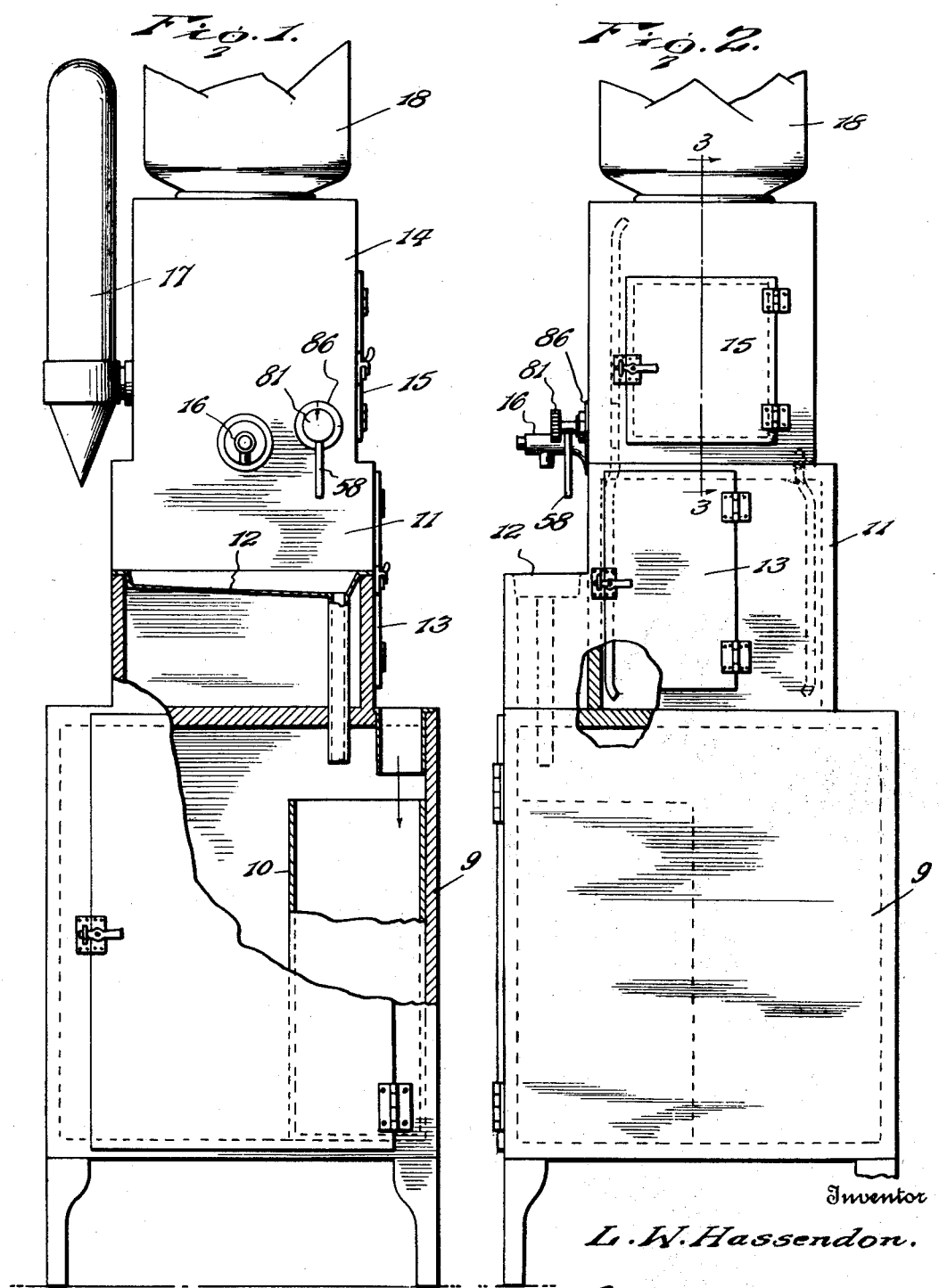

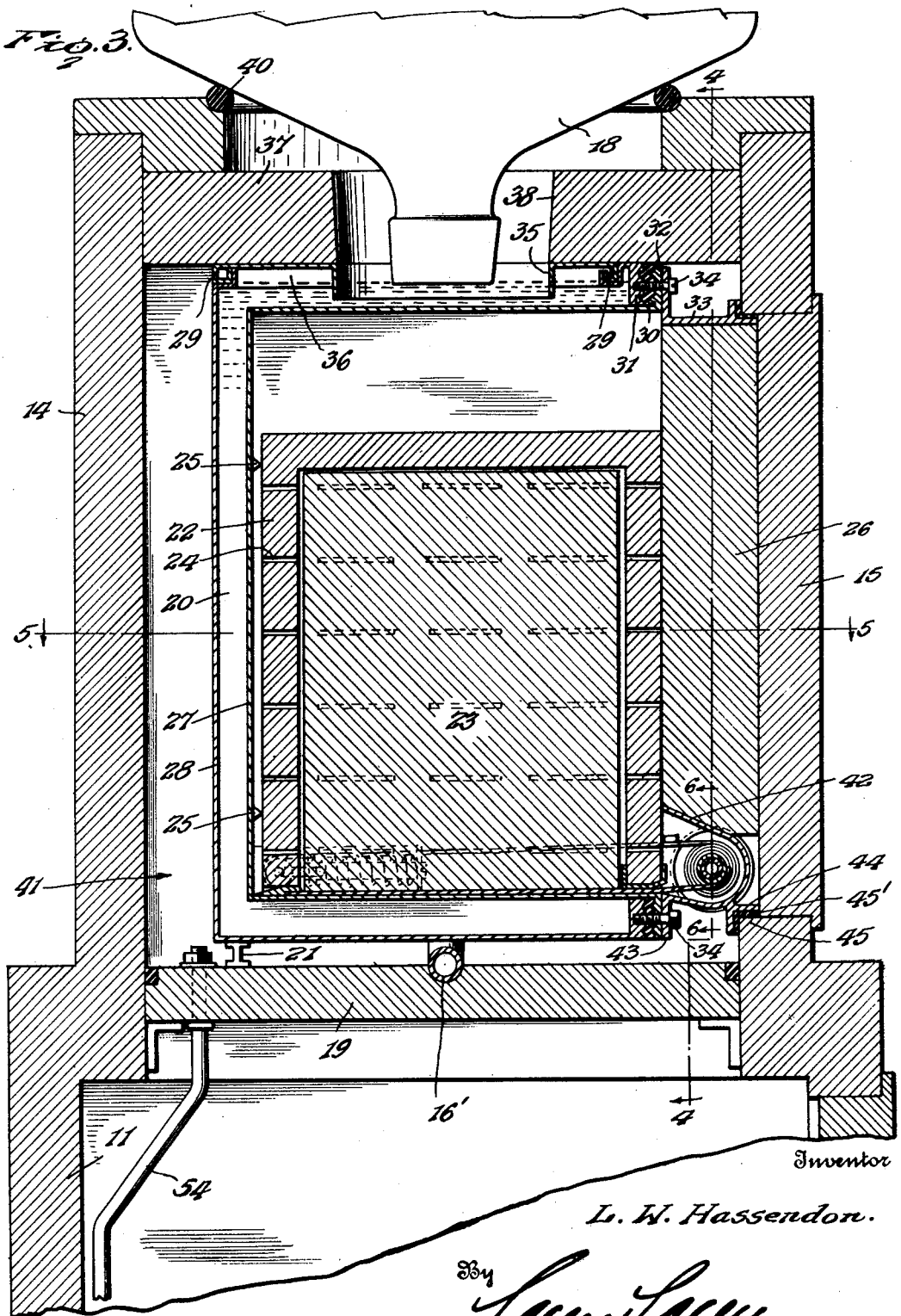

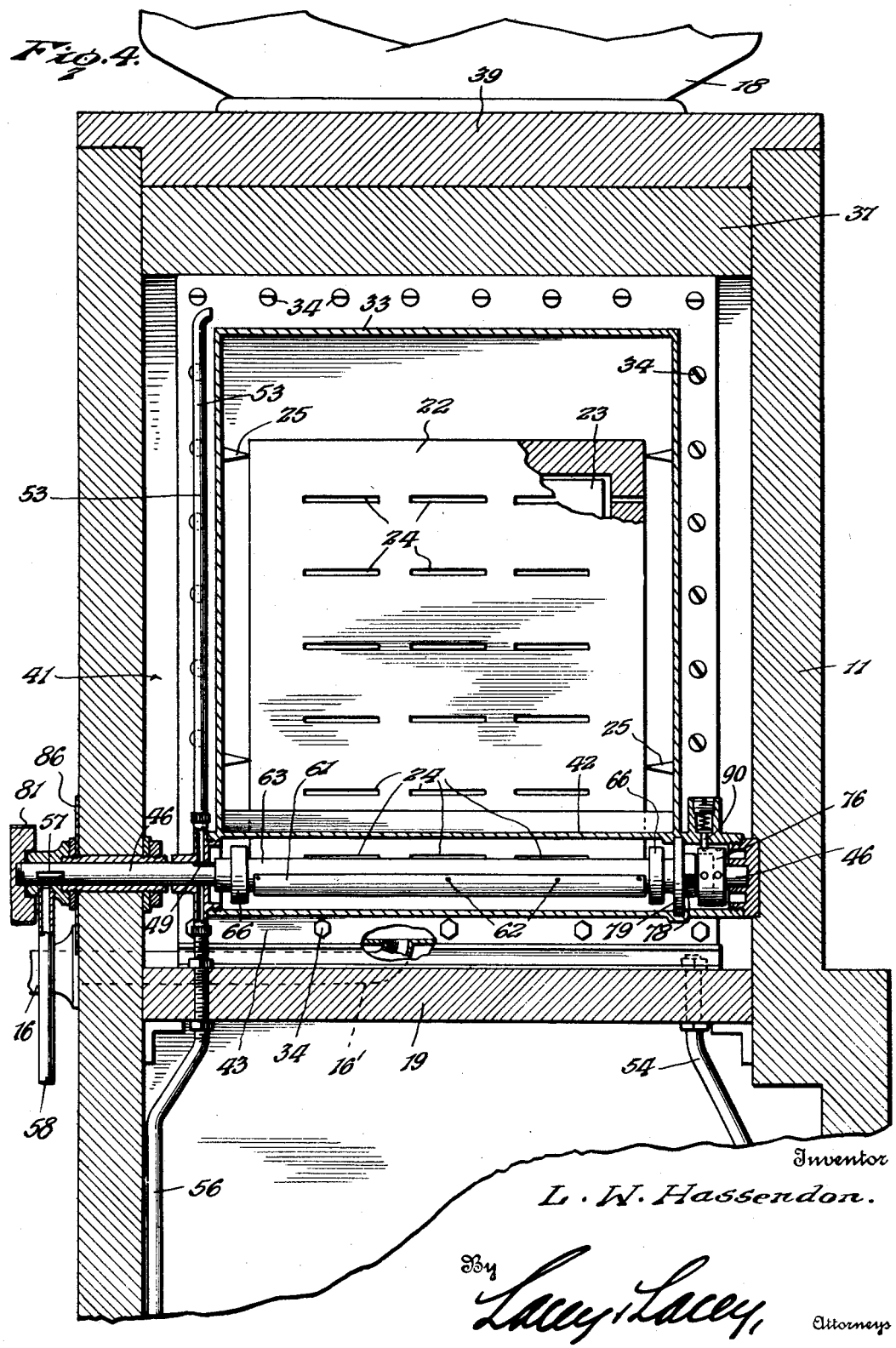

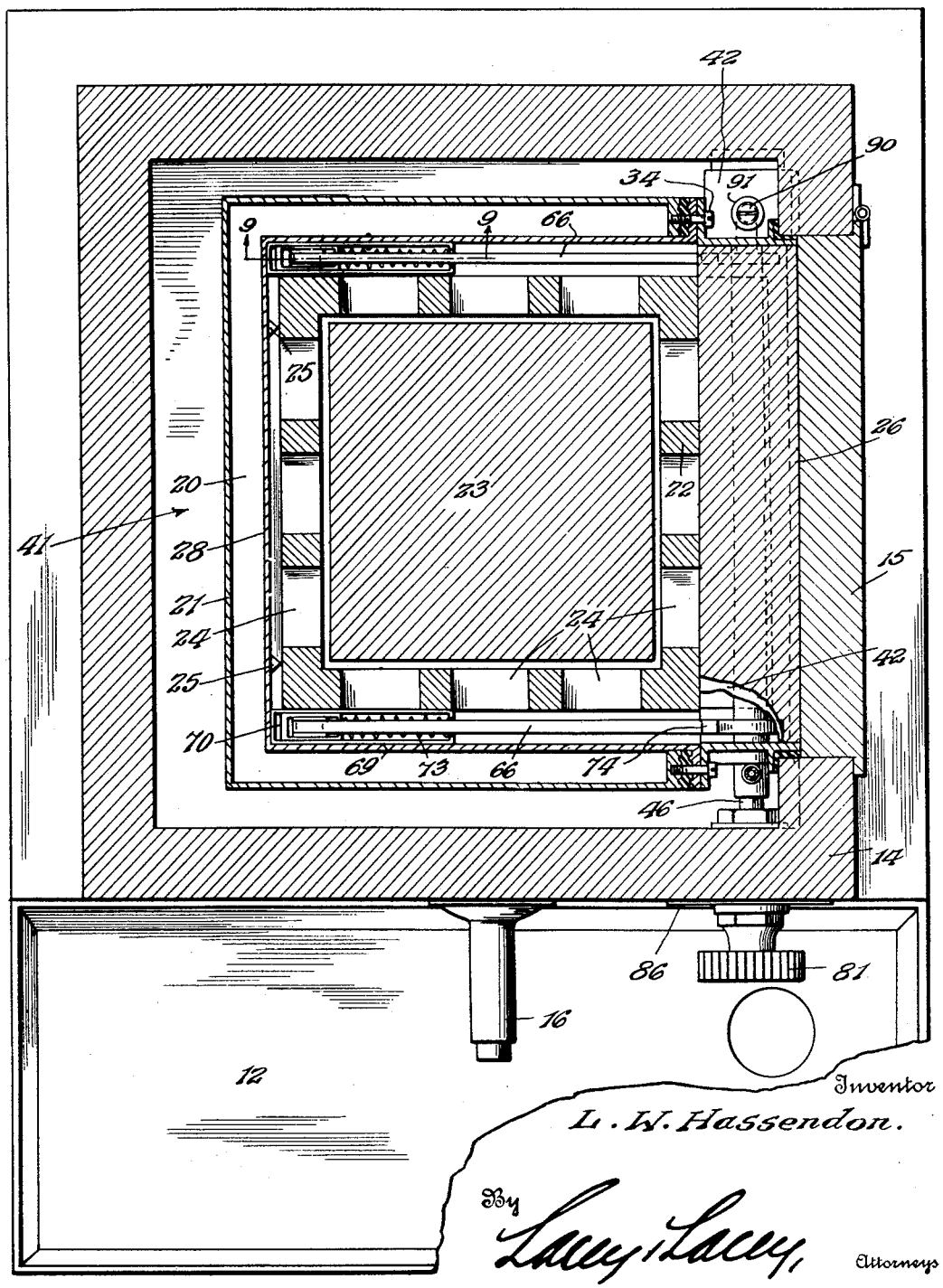

1,939,551

UNITED STATES PATENT OFFICE 1,939,551

WATER COOLER

Louis W. Hassendon, Toledo, Ohio

Application January 30, 1933. Serial No. 654,354

10 Claims. (Cl. 62—91.5)

This invention relates to water coolers and has for an object to provide a device of this class particularly adapted to the use of carbon dioxide gas in solid form, generally termed "Dry Ice".

A further object is to provide a water cooler including a compartment for the drinking water and a cold storage compartment directly below it, to the end that cold gas may simultaneously chill the drinking water and cool the storage compartment.

A further object is to provide control mechanisms whereby the gas may be selectively admitted to the chilling space around the water tank, or directed into the cold storage compartment, or directed outside of the apparatus for chilling drinking water in the glass or cup in which it is to be used.

A further object is to provide a novel insulating pad upon which the "Dry Ice" may be supported in the drinking water compartment to limit sublimating of the ice to the requirements of cold water.

A further object is to provide a novel device for withdrawing, applying, mounting and adjusting the insulating pad.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a front elevation of a water cooler constructed in accordance with the invention, Figure 2 is a side elevation of the parts shown in Figure 1, Figure 3 is a vertical section through the drinking water compartment taken on the line 3—3 of Figure 2, Figure 4 is a vertical section taken on the line 4—4 of Figure 3 with the door insulator removed, Figure 5 is a horizontal section taken on the line 5—5 of Figure 3, Figure 6 is a longitudinal section through the cold control and insulating pad controlling apparatus, taken on the line 6—6 of Figure 3, Figure 7 is a detail of the insulating pad, one of the yielding mountings therefor and the winding tube thereof, Figure 8 is a fragmentary plan view showing the leading edge of the pad and its connection with the operating belts, Figure 9 is an enlarged detail section through one of the resilient mountings of the insulating pad, Figure 10 is a vertical section taken on the line 10—10 of Figure 6, Figure 11 is a vertical section taken on the line 11—11 of Figure 6, and Figure 12 is a vertical section showing the coupling nut and taken on the line 12—12 of Figure 6.

The water cooler comprises generally a lower supporting cupboard 9 adapted to contain an extra empty or full water bottle and a waste paper and waste cup receptacle 10. Supported upon the cupboard is a cold storage compartment 11 on the front of which there is a drain stoop 12. A hinged door 13 on the side of the compartment facilitates access to the compartment. Above and preferably formed as a unit with the cold storage compartment is a drinking water compartment 14 which is provided with a water faucet 16 above the drain stoop 13 and which is connected by a pipe 16' to the hereinafter described water tank. The compartment is also provided with a drinking cup dispenser 17. A water bottle 18 is inverted and the mouth supported in a suitable opening in the top of the drinking water compartment.

Both the drinking water compartment and the cold storage compartment are separated by a horizontal partition 19, best shown in Figure 4, and the walls of both compartments are preferably insulated or formed of insulating material.

Within the drinking water compartment there is disposed a water tank 20 which may be supported on the partition 19 at one side by an I iron 21 and at the opposite side is open to permit access to the interior thereof through the door 15. The tank is of substantially U-shape in vertical cross section and in horizontal cross section to receive an insulating jacket 22 for the "Dry Ice" 23. The jacket is open at the bottom so that the "Dry Ice" may rest directly upon the bottom of the tank. The walls and top of the jacket are provided with slits 24 through which the gas from the sublimating "Dry Ice" may escape, and contact with the wall of the water tank to chill the water. Projections 25 space the jacket from the tank. An insulator 26 is removably interposed between the door 15 and the insulating jacket 22 to hold the latter against the projections.

Removal of the insulator 26 permits the insulating jacket 22 to be removed bodily through the open door 15 and the "Dry Ice" block 23 may be inserted in the jacket and preferably confined therein by straps, whereupon the replenished jacket may be inserted within the water tank and the straps withdrawn.

The water tank 20 may be formed of suitable sheet metal, china, porcelain, stoneware, a synthetic material or a suitable material having a vitrified surface and comprises an inner wall 27 and an outer wall 28, best shown in Figure 3, the walls being secured together at their junctures in any preferred manner, by preferably the interlocking flanges 29. A packing strip 30, as shown in Figure 3, is interposed between flanges 31 and 32 formed at the meeting side edges of the tank adjacent the door and the latter flange forms a support for a frame 33 which is bolted, as shown at 34 in position, as shown in Figure 4. The insulator 26 is received within this frame.

The top of the water tank is provided with an opening 35, best shown in Figure 3, to receive the neck of the water bottle 18. The bottle projects below the water level, indicated by the line 36, in the tank, so that the usual water seal is provided. The weight of the bottle is supported by a cover 37 which rests upon the top of the water tank and also is provided with an opening 38 to loosely receive the neck of the bottle. A retaining ring 39 bears upon the rim of the drinking water compartment and upon the cover 37 and interposed between the ring and the bottle is an annular packing element 40.

It will be observed that an air space 41 exists between the outer wall 28 of the water tank and the inner wall of the drinking water compartment. It is desirable that the cold gas be directed into this space to contact with the outer wall of the tank and assist in chilling the water as well as to assist in cooling the cold storage compartment. To attain this end, I provide a housing 42, best shown in Figures 3 and 4, which is open at one side to receive the cold gas through certain of the slits 24, as shown. The housing is provided with a flange 43 for receiving certain of the above mentioned screws 34 to secure the housing to the lower edge of the tank at the open side thereof. The housing is also provided with a V-shaped foot 44 which embraces the inner corner of the door sill 45, a suitable packing 45' being interposed between the parts. The cold gas entering the housing is conducted therefrom into the air space 41 and into the cold storage compartment, as will now be described.

A tube 46, best shown in Figure 6, is rotatably and slidably mounted in bearings 47 and 48 which close the ends of the housing 42. The tube is provided with a port 49 and the back of the port is closed by a cork 50. The front end of the tube is also closed by a cork 51. The port 49 is disposed to register with an upstanding tube 52, shown in Figure 10, and the latter is equipped with a standpipe 53 which, as best shown in Figure 4, extends upwardly through the air space 41, and it is terminally directed at the tip to empty into the top of the air space. Thus cold gas may escape into the air space and chill the water tank.

As will be observed also by referring to Figure 4, a pipe 54 is directed through the partition 19 and opens into the bottom of the air space 41 so that the cold gas, settling to the bottom of the air space, may sink through the pipe 54 and this pipe extends to nearly the bottom of the cold storage compartment to chill this compartment.

Also for the purpose of chilling the cold storage compartment, the above mentioned post 49, in the tube 46, may be brought into registration with a downwardly extending tube 55 carried by the bearing 47, as shown in Figure 10, which tube is equipped with a pipe 56 which extends downwardly and terminates near the bottom of the cold storage compartment. It will thus be observed that by rotating the tube 46, which actually is a valve, the port 49 may be selectively brought into register with either of the tubes 52 or 55 to direct the cold gas into the drinking water compartment or into the cold storage compartment, and that when the port 49 is in register with the upstanding tube 52 to direct the cold gas into the air space of the drinking water compartment, the cold gas may freely gravitate through the pipe 54 to cool the cold storage compartment.

It is desirable that the cold gas be utilized for carbonating drinking water in the glass or cup in which it is used and for this purpose the tubular valve 46 is provided with a port 57, best shown in Figure 11, which may be brought into register with a downwardly extending pipe 58 carried by a stationary nut 59 which surrounds the end of the tube and is screwed on to a bushing 60 that extends through the wall of the drinking water compartment 14. The port 57 is not in alinement with the port 49 so that when the tubular valve 46 is turned to carry the port 49 out of registration with the standpipe 53, the port 57 will be brought into registration with the pipe 58 and the cold gas then escaping from the housing 42 into the tubular valve through the port 49 and into the space between the corks 50 and 51, will be conducted through the pipe 58 into the water glass or cup for carbonating the water therein. It will be pointed out that when the cold gas is being utilized for carbonating the water in a cup or glass that the gas is shut off from either the standpipe 53 or the downwardly extending pipe 56 so that the gas, in concentrated volume, will be conducted to the drinking water in the glass. Conversely, when the tubular valve 46 is turned to register the port 49 with either the pipe 53 or downwardly extending pipe 56, the gas is cut off from the pipe 58.

For controlling the melting of the ice to a predetermined extent, an insulating pad 61 is adapted to be slipped underneath the "Dry Ice" block 23. One end of the pad is secured by means of screws 62, as best shown in Figure 4, or otherwise, to a sleeve 63 which forms a roller upon which the pad may be wound or unwound. The leading edge of the pad is provided with a metal tapered blade 64, as shown in Figure 8, adapted to easily enter underneath the ice block. The ends 65 of the blade project beyond the longitudinal edges of the pad and are secured to the terminals of spaced parallel operating belts 66 that are looped over yielding pulleys 67, as best shown in Figure 9, and terminally secured to the sleeve 63 so that upon rotation of the sleeve the belts will be wound or unwound on the sleeve according to the direction of rotation and the insulating pad correspondingly placed under or withdrawn from underneath the ice block. Obviously, when the insulating pad is wholly underneath the ice block, as shown in Figure 3, direct contact of the ice block with the water tank will be prevented and sublimating of the ice therefore retarded with consequent retarding of the chilling of the water in the tank. When the pad is withdrawn, to any desired extent from underneath the ice block, the corresponding area of the ice block will be exposed to contact with the tank and the chilling of the water therein proportionately accelerated.

It will be observed that the pulleys 67 must be yieldably supported to permit them to yield, since otherwise the winding up of the insulating pad on the roller by winding up of the belts 66 on the roller could not be accomplished since the diameter of the wound up portion of the pad is different than the corresponding diameter of the wound up portion of the belt. Therefore, to compensate for this difference, the axles of the pulleys 67 are journaled in slots 68 formed in the sides of bearing boxes 69 and are rotatably mounted in sliding boxes 70 carried by pins 71 which are slidably fitted in bearing openings 72 in the bearing boxes 69. Springs 73 surround the pins and yieldably confine the sliding boxes 70 at their outer limit of movement.

To limit winding up of the insulating pad on the sleeve roller 63, stops 74 are provided on the upper sides of the belts 66 to engage with lips 75 formed on the sliding boxes 70, as shown in Figure 9.

For rotating the sleeve, the tube 46 is provided with a coupling nut 76, best shown in Figure 6, which is provided with a hexagonal bore 77 adapted to engage over a correspondingly shaped head 78 carried by a disk 79 which is threaded upon the sleeve 63. The disk is journaled in a suitable opening 80 formed in the housing 42. When the tubular valve 46 is pulled axially through the sleeve the coupling nut 76 engages the head 78 and locks these parts for rotation as a unit in either direction.

The tubular valve 46 is provided with a knob 81 for rotating the valve independently of the sleeve when the valve is pushed inwardly to disengage the coupling nut 76 from the head 78 and control the flow of gas selectively through the pipes 53, 56 or 58. The knob also forms means for rotating the sleeve and shaft as a unit when coupled together by the nut 77 and head 78 for the purpose of winding or unwinding the insulating pad 61 on or off the sleeve roller 63.

It is desirable that a visible indication of the position of the ports to be presented outside of the drinking water compartment and for this purpose the knob 81 is provided with an arrow head 82, best shown in Figure 11, which, when the knob is turned, may be brought into registration with one of three division marks 83, 84 and 85, spaced 90° apart on a dial 86 which is secured by screws 87 or otherwise to the front wall of the drinking water compartment, as shown in Figure 6. When the arrow points to the uppermost division mark 83, the gas will be directed through the port 49 into the standpipe 53, as shown in Figure 10. When the arrow 82 is brought into registration with the division mark 84, the port 57 will have been turned 90° from the position shown in Figure 11 and brought into register with the pipe 58. When the arrow 82 is brought into register with the division mark 85, the port 49 will then have been turned through 180° and will be in register with the downwardly extending pipe 56, shown in Figure 10.

In order to positively stop rotating movement and sliding movement of the tubular valve 46 and at the same time present an audible signal, the coupling nut 76 is provided in its periphery with two annular series of notches 88 and 89, best shown in Figure 6. These notches are in alinement with the corresponding division marks 83, 84 and 85. A pin 90 is seated in a nipple 91 in the housing 42 and is spring pressed to enter one of the notches by means of a helical spring 92, confined under tension against the head of the pin by a screw plug 93 which closes the nipple 91.

When the coupling nut 76 is uncoupled from the head 78, the pin will ride in the series of notches 88 and at the end of each step rotary movement of the tubular valve 46 will enter one of the notches and limit said movement to 90°, designated by the division marks 83, 84 and 85, and will present an audible click. When the tubular valve 46 is withdrawn outwardly through the sleeve 63 to couple the nut 76 to the head 78, the pin 90 will then ride in the series of notches 89 and limit the rotation of the sleeve roller 63 to step rotation so that the insulating pad may be held by the tension of its control springs 73 to any desired extent underneath the ice block.

As a description of the operation has been made as the description of the parts progressed, it is thought that the operation and construction of the invention will be fully understood without further explanation.

What is claimed is:

1. A water cooler comprising a chamber having a door, a perforated jacket in the chamber adapted to contain a solid refrigerant and removable through the door, a water tank loosely surrounding the jacket and having an open side registering with the door, means for supporting a water bottle on the chamber in communication with the tank, and valvular means carried by the chamber adapted to direct cold gas from the interior of the tank to the exterior thereof.

2. A water cooler comprising a chamber, means for supporting a water bottle on the chamber, a perforated jacket in the chamber adapted to contain a solid refrigerant, a water tank in the chamber adapted to communicate with the water bottle and surrounding the jacket, said tank being open at one side to permit removal of the jacket and being spaced from the jacket to provide a gas space between the tank and jacket, valvular means carried by the chamber adapted to direct cold gas from said space to the exterior of the tank, and manually operable means outside of the chamber for actuating said valvular means.

3. A water cooler comprising a chamber, a water tank in the chamber open at one side, means for supporting a water bottle on the chamber in communication with said tank, a housing carried by the chamber in communication with the interior of the water tank at the open side thereof, a perforated jacket in the chamber adapted to be inserted in the water tank through the open side thereof and adapted to contain a solid refrigerant, and valvular means in the housing for controlling flow of cold gas from the interior of the tank into the chamber outside of the tank.

4. A water cooler comprising a chamber, a perforated jacket in the chamber adapted to contain a solid refrigerant, a water tank in the chamber loosely surrounding the jacket, said jacket being open at the bottom to permit the refrigerant to rest upon the bottom of the water tank, and an insulating pad movably mounted in the chamber and adapted to be inserted underneath the solid refrigerant.

5. A water cooler comprising a chamber, a perforated jacket in the chamber adapted to contain a solid refrigerant, a water tank loosely surrounding the jacket and the jacket having an open bottom supported by the bottom of the tank, valvular means mounted in the chamber and adapted to control flow of cold gas from the interior of the tank to the exterior thereof, and an insulating pad operated by said valvular means and adapted to be inserted underneath and withdrawn from underneath the solid refrigerant.

6. A water cooler comprising a chamber, a perforated jacket in the chamber adapted to contain a solid refrigerant, a water tank in the chamber spaced therefrom and loosely surrounding the jacket, said tank being open at one side to permit removal of the jacket therethrough, said jacket having an open bottom whereby the refrigerant rests directly upon the bottom of the water tank, a roller carried by the chamber, looped straps operably connected to the roller to be wound thereon and unwound therefrom, yielding pulleys carried by the chamber disposed in the bights of the looped straps, and an insulating pad carried by the straps and adapted to be carried underneath the refrigerant when the roller is rotated in one direction and adapted to be withdrawn from underneath the refrigerant when the roller is rotated in the opposite direction.

7. A water cooler comprising superposed water cooling and cold storage chambers, a support therefor, means for supporting a water bottle in inverted position on the water cooling chamber, a water tank in said chamber open at one side and in communication at the top with the water bottle, a housing in the chamber in communication with the interior of the water tank, a perforated jacket in the water tank adapted to contain a solid refrigerant, pipes establishing communication between the housing and the water cooling and cold storage chambers, and a valve in the housing adapted to direct the cold gas from the housing selectively through said pipes into the water cooling chamber outside of said tank or into the cold storage chambers.

8. A water cooler comprising superposed water cooling and cold storage chambers, a support therefor, means for supporting a water bottle in inverted position on the water cooling chamber, a water tank in said chamber open at one side and adapted to communicate at the top with the water bottle, a housing in the chamber communicating with the interior of the water tank, a perforated jacket in the chamber adapted to contain a solid refrigerant, said jacket being open at the bottom to permit the refrigerant to rest on the bottom of the water tank, an insulating pad carried by the chamber and adapted to be moved underneath the refrigerant element, a valve in the housing, pipes leading from the housing to the water cooling chamber and to the cold storage chamber respectively, said pipes being controlled by said valve, and means operably connected to the valve and to the insulating pad and actuated by rotation of the valve to operate said insulating pad.

9. A water cooler comprising a chamber, a perforated jacket in the chamber adapted to contain a solid refrigerant, a water tank loosely surrounding the jacket, a housing carried by the chamber communicating with the interior of the water tank, a tubular valve rotatably mounted in the housing, a pipe establishing communication between the interior of the housing and the interior of the chamber outside of the water tank, a pipe carried by the chamber exteriorly thereof, and ports in said tubular valve adapted to be independently brought into register with the first named pipe or the second named pipe whereby to direct cold gas from the housing selectively into said pipes.

10. A water cooler comprising a water cooling chamber, a perforated jacket in the chamber adapted to contain a solid refrigerant, a water tank in the chamber loosely surrounding the jacket and spaced from the inner wall of the chamber, a housing in the chamber communicating with the interior of the tank and adapted to receive cold gas from around the perforated jacket, a cold storage chamber below the water cooling chamber, pipes communicating with the water cooling chamber and with the cold storage chamber respectively and entering said housing, a tubular valve in the housing having a port adapted to be selectively brought into register with said pipes to control the flow of gas from the housing into said pipes, said valve extending outside of said water cooling chamber, a pipe carried by the exterior of the water cooling chamber adapted to receive cold gas from the interior of said valve, and a port in said valve establishing communication between the interior of the valve and the pipe.

LOUIS W. HASSENDON. [L. S.]